US007011245B1

(12) United States Patent
Hu

(10) Patent No.: US 7,011,245 B1
(45) Date of Patent: Mar. 14, 2006

(54) PEDIGREE CODE ENABLING AUTHENTIFICATION THROUGH COMPUTER GENERATED UNBROKEN CHAIN REFLECTIVE CODING INCLUDING TRANSACTION PARTY DATA

(76) Inventor: Michael Hu, 14463 Liddicoat Cir., Los Altos Hills, CA (US) 94022

( * ) Notice: Subject to any disclaimer, the term of this patent is extended or adjusted under 35 U.S.C. 154(b) by 0 days.

(21) Appl. No.: 10/981,717

(22) Filed: Nov. 5, 2004

(51) Int. Cl.
*G06F 17/00* (2006.01)

(52) U.S. Cl. ....................................... 235/375; 235/375

(58) Field of Classification Search ................. 235/375
See application file for complete search history.

(56) References Cited

U.S. PATENT DOCUMENTS 4,423,415 A * 12/1983 Goldman ................... 340/5.86
5,337,361 A * 8/1994 Wang et al. .................. 380/51
6,189,009 B1 * 2/2001 Stratigos et al. .............. 707/10

* cited by examiner

*Primary Examiner*—Steven S. Paik
(74) *Attorney, Agent, or Firm*—Peter Gibson

(57) ABSTRACT

Parallel and reflective coding structures inclusive of data from both parties to a transaction are propagated beginning with an algorithm derived maker's code, an item code unique to and associated with a single article made by a maker, and data identifying both the maker and the legitimate acquirer. Use of secure hash algorithms, single and double key encryption are suggested to obtain two virtually irreversible parallel coding structures that reflect the identities of the current and previous owner and are also mathematically reflective in that one code is derivable by either code structure in verification of both authenticity and ownership. Multiple modes of verification with coding printed on a receipt for the article are provided including Internet, offline computer, land line and SMS cellular telephone. Authenticity, non-repudiation, proof of legitimate ownership and provenance are provided for any article of value including pharmaceuticals and other consumable product warranting authentification.

31 Claims, No Drawings

PEDIGREE CODE ENABLING AUTHENTIFICATION THROUGH COMPUTER GENERATED UNBROKEN CHAIN REFLECTIVE CODING INCLUDING TRANSACTION PARTY DATA

BACKGROUND OF THE INVENTION

1. Field of the Invention

The present invention relates generally to authentification by use of coding, more particularly to authentification by use of coding inclusive of a printed code for an article, and most specifically to authentification by use of coding inclusive of a printed code upon an article and coding generated with, stored, and accessed as computer processed digital data.

2. General Background

Authentification is broadly recognized as encompassing three approaches, often used together in tandem or all at once: physical distinction, human judgement, and coding. Objects made in gold commonly carry a mark indicating gold content in karats: 14k, indicating 14/24 parts or 58% gold; 18k for 75%, et cetera. Silver is typically marked as 'sterling' indicating at least 80% silver content or 0.800, 0.850, 0.925, and often carries other marks indicating the maker, the year, the country, et cetera. And these marks can follow a code. Letters of the alphabet, in succession and in successive series of fonts, indicate the year on silver made in England one to two centuries ago, for example.

But physical distinctions can be imitated and human judgement is usually necessary to determine a genuine article from counterfeit. Solid silver is readily distinguished from plate with a single glance at the object by many people and real diamonds readily distinguished from zirconium. Anyone can tell a poorly made counterfeit note from genuine but well made counterfeits are readily detected only by experts. Printed articles are particularly susceptible to counterfeit since photocopying and digital imaging technologies have become so advanced and inexpensive.

Authentification of antiquities is considered to be almost purely an exercise in human judgement and the very high proportion of suspected counterfeits illustrates the inadequacy in relying upon unobjective human judgement alone. The materials used are often relied upon in support of human judgement. Chemical analysis readily determines the percentage silver or gold in an article and carbon dating has ruined the business in counterfeit prehistoric remains but a Van Gogh is a Van Gogh mainly because people are agreed upon the matter, as evidenced by the style and quality of the painting itself with paintings formerly attributed to an artist of the stature of Van Gogh being occasionally re-considered. In brief, objective physical evidence is not easily obtained if the counterfeiter is careful to use materials consistent with the period or particular method of manufacture.

Relying upon either skill or physical technology to render counterfeiting more difficult is seen to have certain limits owing to reliance upon human judgement. In lieu of evidence gained by scientific method, generally through chemical analysis, any human judgement is susceptible to error and any escalation in skill or technology required for evaluation is counter productive from the perspective of the public. Karat and silver marks assure the prospective legitimate, or illegitimate, acquirer who neither trusts their eye nor desires to perform a chemical analysis. Marks identifying the maker provide a similar and more pertinent assurance. Older silver or gold articles stamped 'Tiffany' command a higher value than an otherwise identical article because the maker is identified.

Identification of the maker adds value in this case and in many others. In this case the intrinsic value of the article is readily apprehended and the gold or silver content easily confirmed. The article is also well made and one may ask why the mark of the maker alone adds value to the article. The simple answer is that the public at large has come to recognize the 'Tiffany' mark and that marks generally facilitate commerce in providing the acquirer assurances regarding the authenticity of the article concerned. The public does not examine their currency for counterfeits but their familiarity with the rather intricate designs used enable at least poorly made phony paper currency to be detected. The material is also relied upon with specially made paper that is prohibited for other uses.

Both physical characteristics and human judgement are hence seen to be relied upon in detection of counterfeits generally. And both marks and printed designs are seen to rely upon material characteristics. Anyone can stamp a silver or gold article with marks but the cost of making the article takes all the profit out of the endeavor: it is more economic to use one's own mark on good silverware or articles made with gold.

There is also little to deter a counterfeiter of pharmaceuticals from reproducing the packaging, container, and all other physical evidence available to the public. Not even chemical analysis is readily applicable for positive identification of modern pharmaceuticals and pharmacists today do not have the time to perform chemical analysis to verify the product in any case: it is not economic. The public and the pharmacist both desire the assurance that the pharmaceuticals are genuine and the manufacturer certainly desires provision assuring that: this is their manufacture and this is the product, or article, that is expected.

Registration numbers are a commonplace, for automobiles and other tangible items as well as intangibles such as licenses to drive the automobile. But registration is useless to product such as pharmaceuticals because registration can only relate a number held in a registry to a person, identified by various means such as physical appearance, residence address, birth date, mother's maiden name etc. Registration largely begs the question of authenticity of an article, particularly with identification of the maker of the article in question, because it can only associate a number with an owner and the maker is incidental.

This leaves coding in its modern sense as generally used for obscuring the content of transmissions or for facilitating machine vision: i.e. encryption, bar code, radio frequency identification (RFID). The use of coding itself in authentification of articles is practically unknown to the prior art as physical evidence is always involved. The most pertinent known reference in this regard, further containing a detailed discussion of the prior art applicable to the present invention, is U.S. Pat. No. 6,463,541: 'Object Authentification Method Using Printed Binary Code and Computer Registry' issued Oct. 8$^{th}$ 2002 to the present inventor and hence does not constitute prior art.

3. Discussion of Prior Art

With regard to prior art by others it is first noted that the term 'authentification' is recognized as having been used for over 25 years as a term used to describe technology relating to protection against counterfeiting, of printed documents such as currency, and information transmitted in digital form. This is seen in the title of a number of U.S. patents over this period including the patent in the name of the present inventor noted above and earlier examples from the prior art:

1 U.S. Pat. No. 4,037,007: 'Document Authentification Paper' issued in 1977;
2 U.S. Pat. No. 4,874,188: 'Fiduciary or Security Object Enabling Visual or Optical Authentification';
3 U.S. Pat. No. 4,893,338: 'System Conveying Information for the Reliable Authentification of a Plurality of Documents';
4 U.S. Pat. No. 5,131,038 'Portable Authentification System'.
5 U.S. Pat. No. 5,652,794: 'Device & Process for Securizing a Document & Graphic Message Authentification Code';
6 U.S. Pat. No. 6,189,096: 'User Authentification Using A Virtual Private Key';
7 U.S. Pat. No. 6,363,151: 'Method & System for Subscriber Authentification and/or Encryption of information'.

Other US patents use the term 'authentification' in the same sense in the abstract if not the title including:

8 U.S. Pat. No. 5,148,007: 'Method For Generating Random Numbers For The Encoded Transmission of Data'; and
9 U.S. Pat. No. 6,401,204: 'Process for Cryptographic Code Management Between First and Second Computer Units'

Securing data transmission, however, is not relevant to the present invention except for the use of public key encryption technology. This 'crypto-system' technology was first set forth by W. Diffie and M. Hellman in the article 'New Direction in Cryptography' published by *IEE Transactions on Information Theory*, Nov. 1976:

> Public key cryptosystem, which relies upon two invertible transformations: $f\{K_d, P\}=C$, and $f\{K_e, C\}=P$, both P and C are on a finite space, possesses the following properties: $K_d$ is inverse of $K_e$ for every n in a finite space, 2) $f\{K_d, P\}$ and $f\{K_e, C\}$ are both easy to compute, 3) given n, and $f\{K_e, C\}$, $K_d$ is computationally infeasible to derive from $K_e$, 4) for every n, it is feasible to compute the inverse pair $K_d$, $K_e$.
>
> Property 3) deploys the difficulty of computing logarithms over Galois Field under modulo q with one number q of elements, e.g. for a primitive element αin GF(q), $Y=\alpha^x \bmod q$ for $1 \leqq x \leqq (q-1)$ is easy to compute given x, but $x=\log_\alpha Y \bmod q$ given Y, is difficult. Should logs mod q become easily computed; then the public key encryption system would be vulnerable;

since developed as related below with regard to more pertinent cryptographic technology.

A popular and effective algorithm for use in public key encryption technique was set forth in 'A Method for Obtaining Digital Signatures and Public Key Cryptosystems' by R. Rivest, A. Shamir, and L. Adleman of Massachusetts Institute of Technology published February 1978 in *Communication of AMC*. The algorithm effects what is known as block cipher in which each block size$\leqq \log_2(n)$ and $n=p*q$ with p and q both being large prime numbers. With P=the plaintext and C=the cipher, the following algorithm is given:

$$C=P^e \, mod(n);\ P=C^d \, mod(n)=(P^\phi)^d \, mod(n)=(P^e)^d \, mod(n)=p^{ed} \, mod(n).$$

Application of the Euler theorem upon the second expression above implies that $ed \equiv 1 \bmod \phi(n)$ which is recognized as the Euler quotient function:

$$\phi(n)=\phi(p*q)=\phi(p)*\phi(q)=(p-1)*(q-1).$$

As disclosed by William Stallings, in 'Cryptography and Network Security: Principles and Practice', 1998, the application of Modulo Arithmetic facilitates calculation of inverse function private and public keys with arbitrary selection of e, a small prime number relative to $\phi(n)$ and $1<e<\phi(n)$, and calculate d using $d=e^{-1} \bmod \phi(n)$, wherein tedious key calculations are avoided and a key generator program can provide a convenient way to select large quantities of key pairs without compromising d, p & q.

4. Statement of Need

Reliance upon physical distinction and human judgement in authentication of articles and identification of the legitimate owner is limited by being essentially unobjective and of little use to the public in providing assurances of authenticity for articles that are easily copied and lacking in obvious or easily discerned intrinsic value. Pharmaceuticals are perhaps the best example of the futility of relying upon appearance of manufacture because the actual product is virtually invisible and all attempts to mark the product, by shape, color, markings, and packaging, are easily duplicated and verification of actual product economically infeasible.

While coding techniques inclusive of public key encryption have been successfully utilized in protection of data transmission use of coding in authentication of physical objects has been generally limited to serial codes placed on objects such as silverware, paper currency, registration systems associating a number with a person, and coding of numbers associated with financial documents. Coding is considered best suited to use in concealing content of communication and authenticating communication but of very limited value in providing authentification of objects because communications are both non-physical and uni-directional. Written communication is composed of a serial arrangement of characters as digital communication is comprised of a serial organization of bytes. Both are systemic abstractions directly translated by code or converted into mathematics essentially without leaving, or requiring, a physical trace.

Traditionally, relations between information are established by using a two dimensional table or relational database, wherein rows (tuples) represent an item, entity or some fact, and columns (attributes) represent properties of those entities or facts. A specific property for a specific entity is written in the cell where the row meets the column. This approach is not only-inefficient, but also open to compromise because the relationship is artificially put into the 'cell', as there are no scientific rules to bind the relations. That is the reason a database must be highly 'guarded' externally and internally. As a result the data containing the properties for each entity can not be distributed to that entity.

Traditional methods for authentification of physical objects have been seen to rely heavily upon physical evidence, usually requiring the exercise of human judgement, as one might expect, because the subject concerned is physical and not an abstraction. An inherent, fundamental, difference in the quality of the subject: abstract versus physical entities is concerned. Many physical articles, however, are easily counterfeited, especially printed material relied upon for identifying product such as pharmaceuticals that are intrinsically resistant to human judgement of the article directly.

In brief coding is considered inimical by nature to authentification of physical objects while suited to concealing communication content because both are of the same stuff: abstractions, and more specifically abstractions using uni-directional processing of discrete characters. And the traditional methods of authentification relying upon human judgements is often subjective, difficult for an average member of the public, and ineffective for many physical articles; particularly essentially opaque articles regarding an easily verifiable identity, such as pharmaceuticals.

It is noted that the identity of the maker of the physical article together with the identity of the article, i.e. authenticity, is often of primary concern while for many products such as pharmaceuticals the identity of the owner is of secondary importance while establishing legitimate ownership is the primary concern of many other objects, such as jewelry or silverware, that are readily authenticated. It is further noted that provenance is often relied upon in establishing both legitimate ownership and authenticity.

A need is hence discerned for a means of authentification for physical entities facilitating both authentication of a physical object and identification of the legitimate owner that does not require exercise of human judgement and is capable of identifying the maker, the article, and provenance.

SUMMARY OF THE INVENTION

Objects of the Invention

The encompassing object of the present invention is a means for authentification of physical entities facilitating authentication of a physical object with verification of the identity of the article and the maker without exercise of human judgement.

Other objects of the present invention include establishment of provenance, ease of use, economic implementation, and non-repudiation of an article by the maker.

Principles Relating to the Present Invention

Achievement of the above identified objects with a fundamentally abstract coding system is suggested wherein the fundamental conflict between abstract and physical entities is addressed by coupling an initial fixed mathematical progression with a second flexible mathematical progression through what are known herein as pedigree nodes. An invariant serial code unique to an article or item (IC) with regard to the maker is used in both progressions. A second invariant code identifying the maker is initially used in both progressions but can be replaced by a code reflecting the identity of a subsequent owner in the flexible coding progression. In the fixed progression a third invariant code, the pseudo item code (PIC), is derived by algorithm and utilized in a public key encryption using a private key to obtain a fourth invariant code, the maker code (MC), which is utilized in a single key encryption operation in the flexible coding progression together with two variable codes, the pedigree code (PC) and the transaction code (TC) which reflects transaction data (TD) from both parties involved in a transaction of the article or item concerned and is initially inclusive of coded data identifying the maker and the first legitimate acquirer in establishing the flexible coding progression and coded data identifying subsequent legitimate acquirers either replace or supplement coded data identifying the previous owner thereby providing means of establishing provenance in addition to the identities of the maker of the article concerned and the article or item itself.

Each coding progression, moreover, can utilize a secure hash algorithm, e.g. a modulo function, wherein the IC associated with the article comprises the modulus operative upon: data identifying the maker, including what is known herein as the maker's fingerprint (MF), in obtainment of the PIC in the fixed coding progression; or in obtainment of the TC from the TD in the flexible coding progression.

In any case the PIC is derivable with public key decryption of the MC that is first established with corresponding private key encryption and subsequently utilized in the flexible coding progression together with the TC and PC. And the TC reflects the TD inclusive of data identifying the legitimate acquirer and the previous owner in generation of the flexible coding progression in at least one pedigree node wherein the previous owner in the first pedigree node is the maker. The MF can be used and can be retained or replaced by data identifying a subsequent previous owner in a subsequent pedigree node.

Similarly, all subsequent owners, inclusive or exclusive of the maker, can be reflected in the flexible coding progression wherein the variable TC is mathematically obtained from variable TD and a variable PC is mathematically obtained from the variable TC and the invariant MC. Public client software released by the maker enables a new acquirer to first calculate the TC from the TD and the IC and then derive, through single key decryption, the MC from the TC and pC and, with public key deception, the PIC from the MC. This PIC is compared with the PIC derived from the initial fixed mathematical progression in authentication of the article as only input of the correct code reflecting identifying data of both parties to a transaction and the correct IC associated with the article can provide a match between the PIC resulting from both derivations.

The progression can be finalized in a final pedigree node with final transaction data ($TD_{FINAL}$) reflecting the identity of the article (IC), a retailer (R), and the consumer (C) or last party to a pedigree node as used in a manner similar to the generation of previous pedigree codes with TD from previous pedigree nodes. A retail receipt can include the printed $TD_{FINAL}$ reflecting IC, R, & C in human readable form so that the consumer, and any subsequent downstream owner, can enter these as data processed in accordance with the above in verification of the identities of the article, the maker, the retailer and the customer, i.e. authentification of the article. Diverse means of authentification can be provided but all are consistent with the matching of independently derived PICs as discussed above.

It is also suggested that a password (PW) chosen by a customer in generation of the $TD_{FINAL}$ be used in place of C identifying the customer. This facilitates authentification by subsequent legitimate owners. Products such as prescription pharmaceuticals wherein subsequent ownership is undesirable render this point moot and having the original customer identified by C is considered preferable to a PW in establishing provenance in other cases such as household items intended to remain within a family.

It is suggested that public client software be made available upon the Internet from which it can be readily accessed for online authentification and also copied and run on any computer. The public client is particular to the maker and invariant with regard to certain product lines if not all made by that maker. The maker can have a plurality of public clients each generic to a particular product line if desired, preferably all accessible from a single web site associated with the maker. Authentification by short message system (SMS) cellular telephone is suggested as is authentification by land line telephone transmission.

NOMENCLATURE $E^P\{d, P\}$: public key encryption using private key d and plain text P;

$E_p\{e, C\}$: public key decryption using public key e and cipher text C;

$$\text{wherein: } E^P\{d, P\}=C \text{ and } E_p\{e, C\}=P. \qquad (1)\ \&\ (2)$$

$E^S[k, M]$: single key encryption using single key k and message M;

$E^{-S}[k, C]$: single key decryption using single key k & cipher text C;

$$\text{wherein: } E^S[k, M]=C \text{ and } E^{-S}[k, C]=M. \qquad (3)\ \&\ (4)$$

MF: maker's fingerprint; code containing data identifying the maker.

IC: item code; unique item identifier for an article unique to maker.

PIC: pseudo item code; derived by algorithm, preferably secure hash;

$$\text{wherein: } PIC=MF\ mod(IC); \tag{5}$$

MC: maker code; derived by algorithm, preferably private key encryption;

$$\text{wherein: } MC=E^P\ \{d, PIC\}. \tag{6}$$

TD: transaction data; inclusive of identifiers of the current and prospective owners;

TC: transaction code; reflecting TD; derived by algorithm, preferably secure hash;

$$\text{wherein: } TC=TD\ mod\ (IC); \tag{7}$$

PC: pedigree code; reflecting identities of: article, maker and last recognized owner; derived from the TC by algorithm, preferably single key encryption, wherein TC is the single key, k, in equation (3) and hence:

$$PC=E^s\ [TC, MC]. \tag{8}$$

DETAILED DESCRIPTION OF PREFERRED EMBODIMENT

It is first noted that:

a. the definitions of public and single key encryption given above in the Nomenclature inclusive of equations (1)–(4) are utilized in accordance with common practice in emphasis of the distinction between the two: i.e. use of different style brackets enclosing the operative elements; while b. all the other definitions given above in the Nomenclature inclusive of equations (5)–(8) reflect the present invention in preferred embodiment of the principles relating to the present invention as discussed in detail below.

A 'maker': i.e. originator, manufacturer, or source; first computer generates several different codes: IC, MC, & PIC; or item code, maker code, and pseudo item code, respectively. There is also a fourth code containing data identifying the maker: the maker's fingerprint (MF) that is utilized in a preferred derivation of the PIC as defined by equation (5): PIC=MF mod (IC). It is emphasized that a secure hash algorithm, e.g. modulo function as used here, is not necessary for derivation of a PIC in accordance with the principles relating to the present invention but the same is preferred and derivation by algorithm is required.

The PIC must be derivable from two different mathematical progressions. One progression, involving the IC and MF in preferred embodiment, is fixed while the other mathematical progression is flexible in reflecting TD which, comprising data identifying the parties to a transaction in accordance with the principles relating to the present invention, are variable.

The flexible mathematical progression is variable in consequence of data from at least two parties concerned in a transaction being necessarily included. An unbroken yet flexible coding chain is described, with the reconciliation of necessarily matching a code such as the PIC generated thereby with the same code generated by the other, fixed, mathematical progression being effected through a forced correspondence between this variable data and a fixed code, such as the MC in the nomenclature utilized herein. In preferred embodiment the fixed value of the MC, determined by the preferred definition given in equations (5 & 6): PIC=MF mod (IC) & MC=$E^P$ {d, PIC}; is derived with a selected mathematical operator providing equivalence between the expressions, e.g. single key encryption, as defined in equations (3) & (4) above. In preferred embodiment equation (8) above: PC=$E^s$ [TC, MC]; is utilized and MC obtained with the converse:

$$E^{-S}\ [TC, PC]=MC. \tag{9}$$

With TC derivable from the TD and IC, and used as the single encryption key k, the MC is hence derivable with input of the TD, IC, and PC in preferred embodiment. The derivation of the PIC by the flexible mathematical progression required for establishing authenticity is preferably obtained with use of public key encryption as defined in equations (1) & (2) with the converse of equation (6): MC=$E^P$ {d, PIC};

$$PIC=E_p\ \{e, MC\}. \tag{10}$$

An additional mathematical operation yielding a transaction code (TC) derived by algorithm specifically dependent upon the TD and the IC, most preferably a secure hash algorithm, as given in equation (7): TC=TD mod (IC); is not needed but is preferred and the addition by substitution into equation (9) above yields:

$$E^{-S}\ [k, TD\ mod\ (IC)]=MC. \tag{11}$$

continued

The preferred derivation of the PIC from the fixed mathematical progression given in equation (5) above: PIC=MF mod (IC); also uses a secure hash algorithm modulo operator that is virtually irreversible mathematically and use of both is not necessary as preferred obtainment of the PIC with the MC as given in equation (11) above uses public key encryption that is specifically reversible but protective of the private key and cannot produce the invariant but unknown PIC without derivation of an invariant code, preferably the MC, with a selected mathematical operator, e.g. single key encryption, providing equivalence between two variable expressions and the invariant code. In the latter the PC is preferably balanced or equated with the variable TC as the private key to produce a constant MC. The TC and the PC vary with each transaction and must be generated in each pedigree node although the single key encryption algorithm, $E^S$, and its reversal, $E^{-S}$, remain invariant.

Use of two variable codes, e.g. TC, PC, together with a fixed code, e.g. MC, in the relation established by single key encryption with an invariant encryption algorithm, $E^S$, and its reversal, $E^{-S}$, in generation of new code in a pedigree node results in a coding progression that is 'stepped' in a manner represented graphically as a step across and a step over; with the first being transfer of the articles concerned and the second the generation of the coding required. This coding generation occurs in a 'pedigree node' as the TD from both parties is used to generate coding reflecting the transaction. The TD initially necessarily contains data specifically identifying the maker preferably with a detail that provides certainty in identification comprising unique verifiable information such as legal name, physical address, phone number, web site address, tax code number, etc., termed a maker's fingerprint (MF) that is compiled in the maker's public client software freely distributed as an authentification tool. Similar information identifying the first legitimate acquirer in also required in generation of the coding required in the first transaction.

This could also be the last transaction, with the first acquirer being a customer, in which case the TD is comprised of the MF or other data identifying the maker who in this instance is also the retailer so that MF=R, and the data identifying the customer (C). The IC is also preferably included in generation of the TC or PC, in any case, and the MF can also be retained through all pedigree nodes so that the customer, even after several intermediary parties involved in pedigree node transactions in distribution before retail to the customer, can preferably be given a sales receipt for the article concerned that bears final transaction data ($TD_{FINAL}$) reflecting data identifying the maker and the article as well as the customer and the retailer. $TD_{FINAL}$, moreover, can utilize a password (PW) for C if desired. This is not desired In the case of pharmaceuticals, but for many other articles use of a PW rather than data, C, identifying the customer facilitates transfer of the article concerned after the final pedigree node as subsequent legitimate acquirers can prove legitimate ownership with knowledge of the password obtained from the previous legitimate owner.

In any case the data reflecting the identity of the intermediary parties such as distributors, $D_1$, & $D_2$, can be dropped from the TD in the flexible coding progression. And data reflecting the identity of the maker can also be dropped from the TD, it is still reflected in other coding, in which preferred case the TD and resulting TC and PC can reflect only the last two parties involved in transaction in the last pedigree node. But even in this case if a PIC that is defined in accordance with equation (5): PIC=MF mod (IC); is utilized then verification of the maker is still provided even though no data identifying the maker is evident to a customer or utilized in the flexible coding progression. And while only two intermediaries between maker and customer enables this situation the customer still has the ability to identify the article, their selves as current owner, the previous owner, and the maker in authentification including proof of provenance.

The identity of all intermediary parties, distributors (D1–Dn), as reflected in the TD and resulting TC and PC can be lost in the coding progression except for the last: the retailer (R). The identities of the customer (C) and the retailer (R) can be verified along with the maker and the article and the identity of the sole distributor can be lost or retained if D is retained in the TD and reflected in the TC and PC. The identities of the customer (C) and the retailer (R) can be verified along with the maker and the article and the identities of the two distributors can be lost or retained if D1 & D2 are retained in the TD and reflected in the TC and PC. In this case, wherein only one intermediary between the customer and the maker exists or the customer wants to sell the article to a second legitimate owner the identity of the intermediary parties becomes moot and the question becomes, to an extent, one of authentification by a second legitimate owner. The use of a password, replacing data identifying the customer in the TD, to facilitate this is recommended.

For purposes of consistent terminology any and all ‘intermediaries’, inclusive of distributors and retailers, between the maker and the ‘customer’, are at a time legitimate owners but there is a final pedigree node defining both the ‘retailer’ and the ‘customer’ or a first legitimate private owner. Generation of new TD incorporating the identity of a second, or third, or fourth, successive legitimate owner after being sold to a customer by a retailer is possible but would require further pedigree nodes. This is undesirable because the name of the retailer, progression valuable to establishing provenance, could be lost in the coding. The identity of the customer is also desired in the TD for prescription pharmaceuticals wherein secondary ownership is essentially moot as undesirable or illegal.

In contrast to this type of product many articles of value are purchased with the intention of keeping the article, perhaps through generations of a family, and identification of the retailer and the first legitimate owner is considered abundantly sufficient in proof of subsequent ownership for obvious reasons. In corollary, it is desirable in this case to prevent generation means of further TD, TC, or PC reflecting new legitimate ownership as a precaution against theft and retroactive establishment of ownership illegitimately. If transfer of ownership legitimately is desired it is suggested that a password be used in place of C in the TD. Alternatively, a receipt preferably bearing final transaction data $TD_{FINAL}$ reflecting the identities of the retailer and the first legitimate owner or customer could be transferred with the article and, if desired, a bill of sale also be signed by the first legitimate owner identifying the purchaser: the second legitimate owner. This process can obviously be repeated and the receipt bearing the $TD_{FINAL}$ provides, at minimum, the means of authenticating the article regardless of the use of a password or any additional bills of sale attesting to legitimate ownership or provenance.

Also, in preferred embodiment, the public client software derives an invariant code, the MC, from TD entered by the owner and the last variable code reflecting the TD dependent TC generated in the last pedigree node: the final pedigree code ($PC_{FINAL}$). The terminology is arbitrary but in order to have variable TD reflected in a variable code and provide for derivation of an invariant code by the public client software with entrance of TD and IC there must be a final pedigree node in which the mathematical value of the TD and the other variable code used in equation with that invariant code, MC, is finalized, in $TD_{FINAL}$, $TC_{FINAL}$, & $PC_{FINAL}$ and the invariant MC is unknown to the public client software except through this data entry dependent derivation using the reverse of the mathematical operator selected to balance TC & PC.

In example of most preferred embodiment of the principles relating to the present invention utilizing the most secure coding progression discussed above taken, arbitrarily, through four pedigree nodes: the maker generates an IC, MC, & PIC in accordance with equations (5) & (6): PIC=MF mod (IC), MC=$E^P$ {d, PIC}; and in the first pedigree node the data identifying the two parties to the transaction are entered along with the IC to produce the TD in accordance with:

$$TD=(IC+PO+NO); \quad (12)$$

wherein PO=data identifying the previous owner and NO=data identifying the new owner. In the first transaction PO identifies the maker, preferably with MF, and the new owner is either the customer, retailer, or distributor respectively identified with C, R, or D. With PO=MF and NO=D1 for the first transaction we have:

Pedigree Node 1

$$TD1=(IC+MF+D1); \quad (12)$$

$$TC1=TD1\ mod(IC); \quad (7)$$

$$PC1=E^S[TC1, MC]; \quad (8)$$

wherein the maker provides PC1 and TC1 to a first distributor D1 who can authenticate the article, data, and coding with use of public client software provided by the maker which calculates:

$$MC=E^{-S}[TC1, PC1]; \quad (9)$$

$$PIC=E^P\{e, MC\}; \text{ and} \quad (10)$$

compares this PIC with the PIC derived by the fixed coding structure, e.g. with:

$$PIC=MF\ mod\ (IC). \qquad (5)$$

The public key derivation of the PIC must match the independently derived derivation of the PIC from the maker using data, preferably a MF, that identifies the maker and the IC: i.e. with the mathematical value of the PIC derived with the fixed coding structure and held in memory in the public client software.

A second pedigree node similarly has:

Pedigree Node 2

$$TD2=(IC+D1+D2); \qquad (12)$$

$$TC2=TD2\ mod(IC); \qquad (7)$$

$$PC2=E^{S}[TC2,\ MC]; \qquad (8)$$

wherein the first distributor D1 provides TC2 & PC2 to a second distributor D2 who can authenticate the article, data, and coding with use of public client software provided by the maker which calculates:

$$MC=E^{-S}[TC2,\ PC2]; \qquad (9)$$

$$PIC=E^{P}\{e,\ MC\};\ \text{and} \qquad (10)$$

compares this PIC with that preferably held in memory in the public client software and generated by equation (5): PIC=MF mod (IC).

A third pedigree node similarly has:

Pedigree Node 3

$$TD3=(IC+D2+R); \qquad (12)$$

$$TC3=TD3mod(IC); \qquad (7)$$

$$PC3=E^{S}[TC3,\ MC]; \qquad (8)$$

wherein a second distributor D2 provides PC3 & TC3 to a retailer (R) who can authenticate the article, data, and coding with use of public client software provided by the maker which calculates:

$$MC=E^{-S}[TC3,\ PC3]; \qquad (9)$$

$$PIC=E^{P}\{e,\ MC\};\ \text{and} \qquad (10)$$

compares this PIC with that preferably held in memory in the public client software and generated by equation (5): PIC=MF mod (IC).

A fourth pedigree node similarly has:

Pedigree Node 4

$$TD4=(IC+R+C); \qquad (12)$$

$$TC4=TD4\ mod(IC); \qquad (7)$$

$$PC4=E^{s}[TC4,\ MC]; \qquad (8)$$

wherein the retailer R provides $TD4=TD_{FINAL}$, preferably printed on a sales receipt, to a customer (C) who can authenticate the article, data, and coding with use of public client software provided by the maker which calculates:

$$TD_{FINAL}=(IC+R+C); \qquad (12)$$

$$TC4=TD4\ mod(IC); \qquad (7)$$

$$MC=E^{-S}[TC4,\ PC_{FINAL}]; \qquad (9)$$

$$PIC=E^{P}\{e,\ MC\};\ \text{and} \qquad (10)$$

compares this PIC with that preferably held in memory in the public client software and generated by equation (5): PIC=MF mod (IC).

Alternatively, R can provide both $TC_{FINAL}$ & $PC_{FINAL}$ to the customer and the public client software restricted to equations (9) & (10) in the same manner suggested for the first three pedigree nodes in the above example. And, for the same reason, the public client software can include equations (12) and (7) as well as (9) and (10) in the previous pedigree nodes if desired. Or the public client can be available two different forms, as suggested in the above example, with the public client available to intermediaries being different than that available to the general public. This is suggested to protect the value of the invariant maker code, MC, as secret to the public and unnecessary in authentification thereby while MC is required in generation of the variable codes: in equation (8) in the above example.

As mentioned earlier C, data identifying the customer, preferably included in the TD can be replaced by a password (PW) whereby equation (12) above becomes:

$$TD_{FINAL}=(IC+R+PW); \qquad (13)$$

which facilitates transfer of the article concerned to subsequent owners who, given the PW, can validate legitimate ownership with input of the PW necessary to obtain matching of the PIC calculated from the flexible coding progression with the PIC calculated from the fixed coding progression.

If a password, PW, is utilized it is selected by the customer and inputted in the final pedigree node for generation of equations (13), (7) & (9), (10) and is subsequently entered into the public client software in authentification by any subsequent owner of the article preferably with input of the other data required of equation (13): IC & R, both further preferably printed on a receipt. The data identifying the customer can be included on a receipt as well if desired. This is suggested particularly for product such as pharmaceuticals that are not intended to be subsequently transferred to another owner. The customer can also use their name as a PW and the data identifying the customer, C, be hidden as a third option.

In any case it is necessary to enter $TD_{FINAL}$, equal to TD4 in the above example, into the public client software in authentification. If C is used the public client software can calculate the entire mathematical progression of equations (12), (7), (9), (10) in verification by matching the two PICs. It is preferred that the IC be printed upon the article or container for the same and necessary that $TD_{FINAL}$ include the IC. The name of the retailer, or data R identifying the retailer, is preferably also included in $TD_{FINAL}$ but is not strictly necessary and, as mentioned earlier, the TD may include intermediaries D and a MF if desired.

A receipt bearing the $TD_{FINAL}$ or the $TC_{FINAL}$ & $PC_{FINAL}$ printed thereupon can be transferred with the article in subsequent transactions as discussed above. The customer: i.e. last party to a pedigree node generating transaction dependent coding reflecting the identities of the parties involved in transaction; and any subsequent legitimate owner can access the public client software made available by the maker in authentification of the article with entrance of the $TD_{FINAL}$ inclusive of the IC or the IC, $TC_{FINAL}$ & $PC_{FINAL}$.

The public client software performing this data processing in verification of authenticity is preferably available in a plurality of different forms or avenues: Internet; land line telephone, digital radio frequency (RF) telephone: i.e. short message system cellular telephone (SMS cell phone); or any offline computer. The public client software is preferably generic to a maker, or a line of product by a particular maker, to enhance public access and verification. Copies of the public client software are intended to be freely available. Duplication of this software does not present an opportunity for counterfeiters because authentification is inclusive of the identity of the last legitimate owner.

It is lastly commented that no system is unbreakable given sufficient time and resources. The methodology disclosed herein has many 'one way functions' that are easy and efficient for legitimate parties to utilize but are computationally infeasible and costly to break for illegitimate reasons, whether for economic gain or other reasons. Key length or character string length can be increased or decreased as considered appropriate for the protection desired. For many products such as pharmaceuticals the time required to break a code can easily exceed the useful life time of the item concerned or require a cost to compromise exceeds any possible profit to be derived from the compromise. For other more valuable items the time required to break sufficiently lengthy coding can exceed the life time of an opponent.

The foregoing is intended to provide one practiced in the art with the best known manner of effecting preferred embodiment of the principles relating to the present invention and is not to be construed in any manner as restrictive of said invention or of the rights and privileges secured by Letters Patent for which I claim:

1. Authentication of articles, i.e. physical entities, by computer generated coding wherein:
- one invariant code is derived by algorithm in two parallel coding progressions, one fixed, the other flexible in reflecting data identifying both parties to a transaction of a physical entity, both said coding progressions utilize an item code (IC) unique to, generated by the maker of, and associated with the physical entity;
- both said coding progressions are related by use of public key encryption involving said one invariant code with the corresponding public key contained in public client software capable of processing data in accordance with the flexible coding progression;
- said flexible coding progression includes a software selected mathematical operator providing equivalence between two variable codes, which reflect data identifying both said parties, and said one invariant code; and
- matching of said invariant code derived by said flexible coding progression with said invariant code derived by said fixed coding progression provides mathematical verification of the identity of the maker, the article concerned, and two parties to a transaction of said article.

2. Authentification in accordance with claim 1 wherein at least one said coding progression includes a virtually irreversible mathematical operation inclusive of, but not restricted to, secure hash algorithms including modulo operators.

3. Authentification in accordance with claim 1 wherein both said coding progressions includes a virtually irreversible mathematical operation inclusive of, but not restricted to, secure hash algorithms including modulo operators.

4. A computer based data processing method for authentification of articles comprising the steps of:
- generating an invariant item code (IC) associated with an article made by a maker in a fixed coding progression;
- generating an invariant pseudo item code (PIC) with an algorithm utilizing said IC and data identifying the maker in said fixed coding progression;
- generating an invariant maker code (MC) by public key encryption using a private key operative upon said PIC in said fixed coding progression;
- generating, in at least one pedigree node of a flexible coding progression, a variable transaction code (TC) from transaction data (TD) inclusive of data identifying both parties to a transaction involving said article and a variable pedigree code (PC) reflecting said TC with a reversible selected mathematical operator balancing said variable TC and PC with said invariant MC;
- whereby public client software made available to the public by the maker is capable of authenticating said article with entry of said IC and TD by performing the steps of:
- calculating said TC from said IC and TD;
- deriving said MC from said TC and the PC using the reverse of said selected mathematical operator balancing the variable TC and PC with said invariant MC in each pedigree node;
- deriving said PIC from the MC calculated from said TC and PC with public key decryption using the public key corresponding to the private key utilized in deriving said MC in said fixed coding progression;
- matching said PIC derived with public key encryption with the PIC derived with an algorithm in said fixed coding progression.

5. The method of claim 4 wherein said data identifying the maker utilized in generating said PIC with an algorithm utilizing said IC in said fixed coding progression comprises a maker fingerprint (MF) reflecting unique verifiable information sufficiently detailed to provide certainty in identification.

6. The method of claim 4 wherein said data identifying the maker utilized in generating said MC by public key encryption using a private key operative upon said PIC in said fixed coding progression comprises a maker fingerprint (MF) reflecting unique verifiable information sufficiently detailed to provide certainty in identification.

7. The method of claim 4 wherein said algorithm utilized in generating said PIC in said fixed coding progression comprises a virtually irreversible secure hash algorithm inclusive of, but not restricted to, modulo operators.

8. The method of claim 7 wherein said virtually irreversible secure hash algorithm utilized in generating said PIC in said fixed coding progression comprises a modulo operation wherein the IC is the modulo operator.

9. The method of claim 8 wherein said modulo operation is determined by PIC=MF mod(IC) wherein MF comprises a maker fingerprint reflecting unique verifiable information sufficiently detailed to provide certainty in identification of the maker.

10. The method of claim 4 wherein said public client software calculates said TC from said IC and TD with an algorithm.

11. The method of claim 10 wherein said algorithm used by said public client software to calculate said TC from said IC and TD comprises a virtually irreversible secure hash algorithm inclusive of, but not restricted to, modulo operators.

12. The method of claim 11 wherein said virtually irreversible secure hash algorithm utilized to calculate said TC from said IC and TD by said public client software comprises a modulo operation wherein the IC is the modulo operator.

13. The method of claim 12 wherein said modulo operation is determined by TC=TD mod (IC).

14. The method of claim 4 wherein a final pedigree node is observed in generating final transaction data, $TD_{FINAL}$, that is invariant.

15. The method of claim 14 wherein said $TD_{FINAL}$ is inclusive of the IC.

16. The method of claim 15 wherein both parties to a transaction in a final pedigree node comprise a retailer and a customer and data identifying each: R & C, respectively; are included in said $TD_{FINAL}$.

17. The method of claim 16 wherein a password (PW) is selected by the customer and is included as C in said $TD_{FINAL}$.

18. A computer based data processing method for authentication of articles comprising the steps of:

generating an invariant item code (IC) associated with an article made by a maker in a fixed coding progression;

generating an invariant pseudo item code (PIC) with an algorithm utilizing said IC and data identifying the maker in said fixed coding progression;

generating, in at least one pedigree node of a flexible coding progression, a variable transaction code (TC) from transaction data (TD) inclusive of data identifying both parties to a transaction involving said article and a variable pedigree code (PC) reflecting said TC with a reversible selected mathematical operator balancing said variable TC and PC with said invariant MC;

whereby public client software made available to the public by the maker is capable of authenticating said article with entry of said TC and PC by performing the steps of:

deriving said MC from said TC and the PC using the reverse of said selected mathematical operator balancing the variable TC and PC with said invariant MC in each pedigree node;

deriving said PIC from the MC calculated from said TC and PC with public key decryption using the public key corresponding to the private key utilized in deriving said MC in said fixed coding progression;

matching said PIC derived with public key encryption with the PIC derived with an algorithm in said fixed coding progression.

19. The method of claim 18 wherein said data identifying the maker utilized in generating said PIC with an algorithm utilizing said IC in said fixed coding progression comprises a maker fingerprint (MF) reflecting unique verifiable information sufficiently detailed to provide certainty in identification.

20. The method of claim 18 wherein said data identifying the maker utilized in generating said MC by public key encryption using a private key operative upon said PIC in said fixed coding progression comprises a maker fingerprint (MF) reflecting unique verifiable information sufficiently detailed to provide certainty in identification.

21. The method of claim 18 wherein said algorithm utilized in generating said PIC in said fixed coding progression comprises a virtually irreversible secure hash algorithm inclusive of, but not restricted to, modulo operators.

22. The method of claim 21 wherein said virtually irreversible secure hash algorithm utilized in generating said PIC in said fixed coding progression comprises a modulo operation wherein the IC is the modulo operator.

23. The method of claim 22 wherein said modulo operation is determined by PIC=MF mod(IC) wherein MF comprises a maker fingerprint reflecting unique verifiable information sufficiently detailed to provide certainty in identification of the maker.

24. The method of claim 18 wherein said TC is generated from said TD in said flexible coding progression with an algorithm.

25. The method of claim 24 wherein said algorithm used in said flexible coding progression to generate said TC from said TD comprises a virtually irreversible secure hash algorithm inclusive of, but not restricted to, modulo operators.

26. The method of claim 25 wherein said virtually irreversible secure hash algorithm utilized in generating said TC from said TD in said flexible coding progression comprises a modulo operation wherein the IC is the modulo operator.

27. The method of claim 26 wherein said modulo operation is determined by TC=TD mod (IC).

28. The method of claim 18 wherein a final pedigree code is observed in generating a final transaction code, $TC_{FINAL}$, and a final pedigree code, $PC_{FINAL}$, that are both invariant.

29. The method of claim 28 wherein said $TC_{FINAL}$ and said $PC_{FINAL}$ are reflective of the IC.

30. The method of claim 28 wherein both said parties to a transaction in a final pedigree node comprise a retailer and a customer and data identifying each, R & C, respectively, are reflected in said $TC_{FINAL}$ and said $PC_{FINAL}$.

31. The method of claim 30 wherein a password (PW) is selected by the customer and is reflected as C in said $TC_{FINAL}$ and said $PC_{FINAL}$.

* * * * *